(12) United States Patent
Kritt et al.

(10) Patent No.: US 9,984,441 B2
(45) Date of Patent: May 29, 2018

(54) UNOBTRUSIVE SIZING AND PLACEMENT OF POP-UPS

(71) Applicant: LENOVO Enterprise Solutions (Singapore) PTE, LTD., New Tech Park (SG)

(72) Inventors: Barry A. Kritt, Atlantic Beach, NC (US); Sarbajit K. Rakshit, Kolkata (IN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 370 days.

(21) Appl. No.: 14/307,817

(22) Filed: Jun. 18, 2014

(65) Prior Publication Data
US 2015/0371363 A1 Dec. 24, 2015

(51) Int. Cl.
G06F 3/048 (2013.01)
G06T 3/40 (2006.01)
G06F 3/01 (2006.01)
G06F 3/0484 (2013.01)
G06T 19/00 (2011.01)

(52) U.S. Cl.
CPC .............. G06T 3/40 (2013.01); G06F 3/013 (2013.01); G06F 3/04842 (2013.01); G06T 19/006 (2013.01)

(58) Field of Classification Search
USPC ................. 715/780, 711, 715, 808
See application file for complete search history.

(56) References Cited

U.S. PATENT DOCUMENTS

| 6,934,743 B2 | 8/2005 | Huat |
| 7,743,340 B2 | 6/2010 | Horvitz et al. |
| 7,971,136 B2 | 6/2011 | Menachem et al. |
| 8,547,330 B2 | 10/2013 | Buck |
| 2007/0094612 A1* | 4/2007 | Kraft ............... G06F 3/0481 715/808 |
| 2009/0141895 A1* | 6/2009 | Anderson ........... G06F 21/84 380/252 |

(Continued)

FOREIGN PATENT DOCUMENTS

KR 10-2015-0054413 * 5/2015 ............... G06F 3/01

OTHER PUBLICATIONS

Yi-Leh Wu et al., Gaze direction estimation using support vector machine with active appearance model, Sep. 7, 2012, Springer Science & Business Media LLC (Year: 2012).*

(Continued)

Primary Examiner — Tam T Tran
(74) Attorney, Agent, or Firm — Kunzler, PC.

(57) ABSTRACT

A method, system, and computer program product for unobtrusive sizing and placement of pop-ups are provided in the illustrative embodiments. In a method for displaying a pop-up graphical user interface (GUI), using a device to detect eye movements, a first area of a display device is detected where a content is being displayed, the first area being where an attention of a user is focused. A change in the attention of the user to a second area during a future period is predicted. A third area is identified on the display device, wherein the third area excludes the first and the second areas. The pop-up GUI is displayed in the third area.

14 Claims, 7 Drawing Sheets

(56) References Cited

U.S. PATENT DOCUMENTS

2014/0139652 A1* 5/2014 Aiden ................ H04N 13/0402
                                                        348/54
2015/0130705 A1*  5/2015 Im ......................... G06F 3/0481
                                                        345/156
2015/0309565 A1* 10/2015 Beri ....................... G06F 3/013
                                                        715/776

OTHER PUBLICATIONS

Eye movements could be next generation pc password, Oct. 14, 2012, SyndiGate Media Inc, (Year: 2012).*

* cited by examiner

UNOBTRUSIVE SIZING AND PLACEMENT OF POP-UPS

TECHNICAL FIELD

The present invention relates generally to a method, system, and computer program product for presenting pop-up graphical user interface on a display. More particularly, the present invention relates to a method, system, and computer program product for unobtrusive sizing and placement of pop-ups.

BACKGROUND

Any device usable to display information using a GUI is referred herein to as a display device. A computer monitor, a smartphone screen, and a touch-screen on an interactive device are some examples of a display device.

A pop-up is a graphical presentation of information that is overlaid on existing content that is being presented via a graphical user interface (GUI). For example, users are quite familiar with a small window, which is overlaid on whatever content or window is already displayed on a user's display device and prompts the user to supply a login and password when the user accesses certain websites or applications.

Any manner of overlaying one presentation of information with another graphical presentation of another information on a display device, whether as a graphical window smaller than another window displayed on the display device, a window of the same size or larger as compared to the other window, above such other window, below such other window, requiring an input to disappear, having a timed appearance and/or disappearance feature, or a combination of these and other manners is collectively referred to as a pop-up (plural, pop-ups) in this disclosure. Pop-ups are commonly used for presenting prompts, warnings, notifications, advertising, and many other types of information to the user. Any number of pop-ups can be presented simultaneously or in sequence on a given display device.

SUMMARY

The illustrative embodiments provide a method, system, and computer program product for unobtrusive sizing and placement of pop-ups. An embodiment includes a method for displaying a pop-up graphical user interface (GUI). The embodiment detects, using a device to detect eye movements, a first area of a display device where a content is being displayed, the first area being where an attention of a user is focused. The embodiment predicts a change in the attention of the user to a second area during a future period. The embodiment identifies a third area on the display device, wherein the third area excludes the first and the second areas. The embodiment displays the pop-up GUI in the third area.

Another embodiment includes a computer usable program product comprising a computer readable storage device including computer usable code for displaying a pop-up graphical user interface (GUI). The embodiment further includes computer usable code for detecting, using a device to detect eye movements, a first area of a display device where a content is being displayed, the first area being where an attention of a user is focused. The embodiment further includes computer usable code for predicting a change in the attention of the user to a second area during a future period. The embodiment further includes computer usable code for identifying a third area on the display device, wherein the third area excludes the first and the second areas. The embodiment further includes computer usable code for displaying the pop-up GUI in the third area.

Another embodiment includes a data processing system for displaying a pop-up graphical user interface (GUI). The embodiment further includes a storage device including a storage medium, wherein the storage device stores computer usable program code. The embodiment further includes a processor, wherein the processor executes the computer usable program code. The embodiment further includes computer usable code for detecting, using a device to detect eye movements, a first area of a display device where a content is being displayed, the first area being where an attention of a user is focused. The embodiment further includes computer usable code for predicting a change in the attention of the user to a second area during a future period. The embodiment further includes computer usable code for identifying a third area on the display device, wherein the third area excludes the first and the second areas. The embodiment further includes computer usable code for displaying the pop-up GUI in the third area.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that presently, pop-ups are presented in a manner that interrupts a user's attention an ongoing activity on a user's display device. In other words, presently used manner of presenting pop-ups is obtrusive.

In some present cases, the obtrusiveness of the pop-up results from where on the display device the pop-up is displayed. For example, a user may be reading the content presented in a browser window when a pop-up is displayed. Only as an example, assume that the content was displayed somewhere approximately in the center of the display device. Many pop-ups occupy the center of the screen when they are displayed. Thus, in the example, the pop-up appears where the content was displayed, obscuring the content the user was intently reading. The user has to interrupt his attention to the content, take some action or wait for something to occur to make the pop-up disappear, and then try to regain the same level of attention to the content.

In other present cases, the obtrusiveness of the pop-up results from the size of the pop-up on the display device when the pop-up is displayed. For example, a user may be reading the content presented in a browser window when a pop-up is displayed. Only as an example, assume that the content was displayed somewhere towards the bottom-right of the display device and sufficiently out of the way from most center-of-the-screen pop-ups. Many pop-ups occupy a significant portion of the screen, if not the entire screen, when they are displayed. Thus, if the pop-up in the example such a large pop-up, the pop-up intrudes into the area where the content was displayed, obscuring the content the user was intently reading. The user has to again interrupt his attention to the content, take some action or wait for something to occur to make the pop-up disappear, and then try to regain the same level of attention to the content.

The illustrative embodiments used to describe the invention generally address and solve the above-described problems and other problems related to presenting pop-ups on a display device. The illustrative embodiments provide a method, system, and computer program product for unobtrusive sizing and placement of pop-ups.

An embodiment detects that a pop-up window is about to be displayed on a display device. The embodiment detects that a user is focused on the display device. For example, using a camera oriented to capture the user's eye movements, one embodiment tracks the user's focus and determines that the user's eyes are moving in a manner suggesting that the user is focusing on reading English language content from left to right and top to bottom within an area of the display device.

An embodiment determines an area of future focus for the user. For example, using a history of the user's focus tracking, one embodiment determines that over the next one-to-two seconds, the user's focus is likely to be two lines down in the second column of the displayed three column text. The embodiment further computes that the distance from the present focus up to two lines down is approximately three quarters of an inch, into an area that is approximately two lines tall and the width of the column, e.g., approximately three quarters of an inch by three inches in size. The embodiment further determines that the future area of the focus is located at a particular distance and direction from some coordinate of the display device. For example, in the above example, the embodiment determines that the future area of the focus will be, and centered approximately three inches down and three inches to the right of the screen center.

Another embodiment determines an area of future focus for the user by using other techniques. For example, the embodiment identifies the document that is being displayed in the area of the user's present focus. The embodiment uses the document's metadata to determine the layout of the document portion where the user's eyes are focused. Using such metadata, one embodiment determines that the portion currently being displayed to the user in the user's focus area is a three column text containing line spacing where two lines are about three quarters of an inch tall and the columns are about three inches wide.

With such information, the embodiment determines that over the next one-to-two seconds, the user's focus is likely to be two lines down in the second column of the displayed three column text. The embodiment further computes that the distance from the present focus up to two lines down is approximately three quarters of an inch, into an area that is approximately two lines tall and the width of the column, e.g., approximately three quarters of an inch by three inches in size. The embodiment further determines that the future area of the focus is located at a particular distance and direction from some coordinate of the display device. For example, in the above example, the embodiment determines that the future area of the focus will be, and centered approximately three inches down and three inches to the right of the screen center.

These example manners of determining where the user's focus presently is, and where the focus is likely to be in the future are not intended to be limiting on the illustrative embodiments. From this disclosure, those of ordinary skill in the art will be able to ascertain similar information by other methods, and such other methods are contemplated within the scope of the illustrative embodiments.

Once an embodiment has determined the area of the future focus of the user over a pre-determined future period, one embodiment identifies the portion of the display device that is not likely to be the focus of the user. An embodiment further computes an available area in that portion to display the pop-up.

An embodiment resizes, or adjusts the size of, the pop-up to fit within the available area in that portion. An embodiment then presents or displays the pop-up in that portion where the user is not focused, and ensures that the pop-up is of a size that does not exceed the available area in that portion.

Operating in this manner, one or more embodiments cause the pop-up to be presented in a non-obtrusive manner, without causing the obscuring of the content where the user is focused on the display device, and without causing an interruption in the user's attention to make the pop-up disappear. For example, the user may notice the pop-up appearing somewhere on the screen but that the pop-up is not overlaid on the content the user was reading or with which the user was interacting. Advantageously, an implementation of one or more embodiments described herein allows the user to continue reading or interacting with content where the user was focused before the pop-up appeared on the user's display device, and preventing the pop-up from intruding on the user's experience with the content.

The illustrative embodiments are described with respect to certain display devices, content, metadata, manners of detecting and tracking focus (user's attention), focus tracking devices, sizes, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
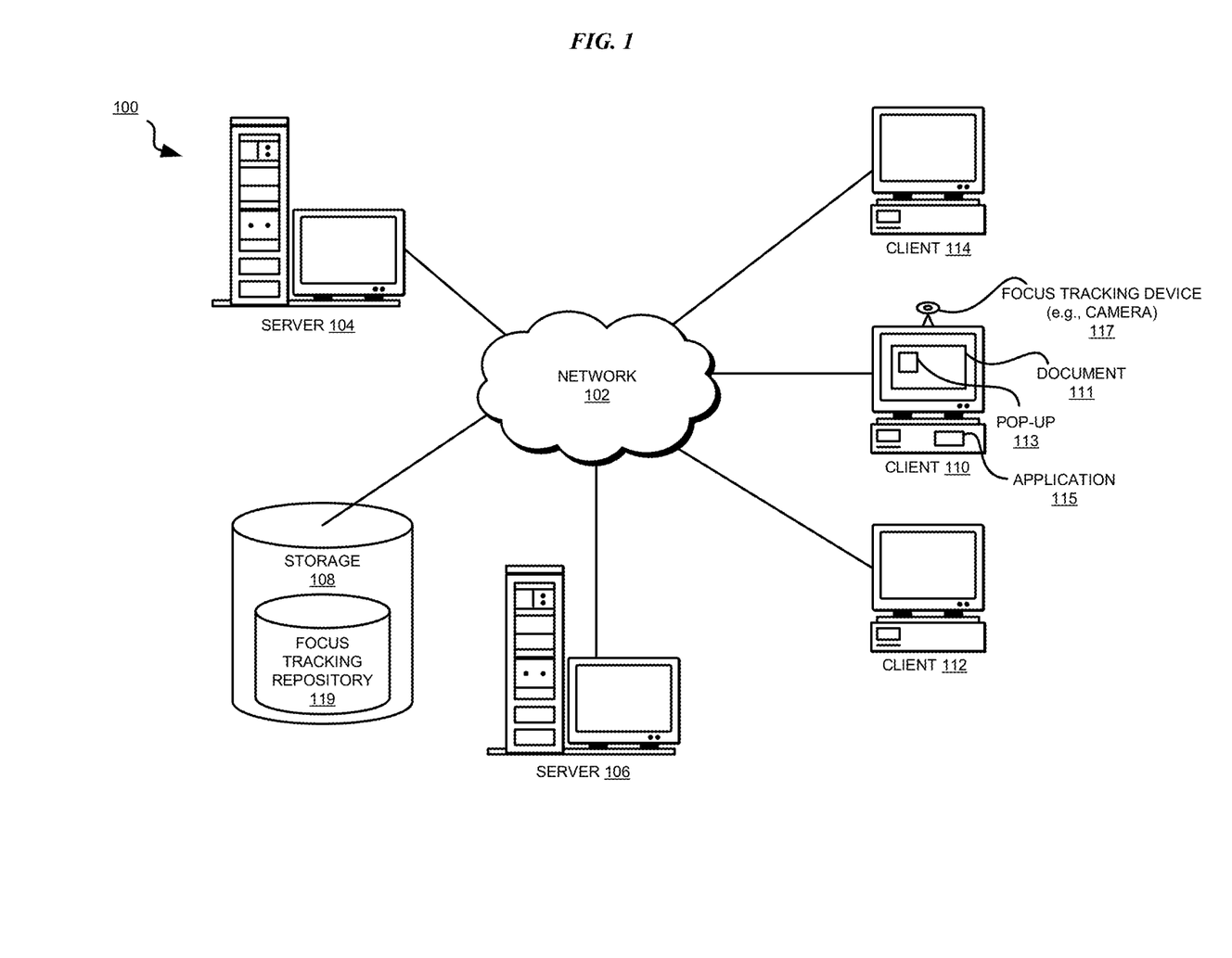
FIG. 1 depicts a block diagram of a network of data processing systems in which illustrative embodiments may be implemented.
Figure 2:
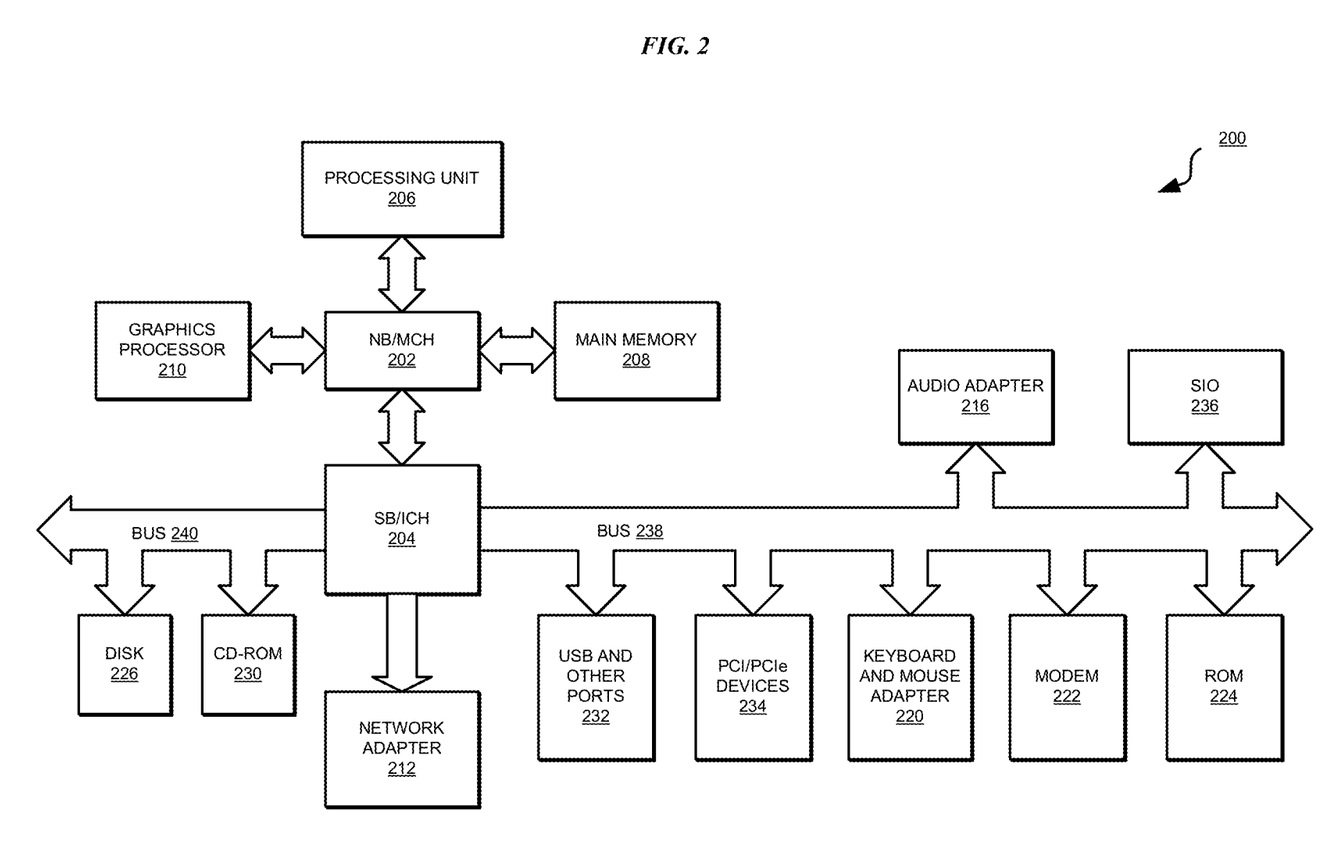
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Document 111 comprises content where a user's attention is focused. Application 115 implements one or more embodiments described herein. Pop-up 113 is a pop-up unobtrusively sized and positioned relative to the content of document 111 according to an embodiment implemented in application 115. Application 115 uses, for example, focus tracking device 117 to perform an operation described herein. Only as an example and without implying a limitation thereto, focus tracking device 117 is depicted as a camera, which is oriented such that the camera can track the movements of the user's eyes as the user interacts with the content of document 111. Repository 119 in storage 108 is one example way of storing historical focus tracking data captured by focus tracking device 117, and for use by application 115 in a manner described herein. In one embodiment, repository 119 is associated with client 110, such as within client 110. In another embodiment, repository 119 is accessible over a network from client 110, as depicted.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of an embedded, removable, or mobile computing device component, such as an example implementation of focus tracking device 117 in FIG. 1 in which computer usable program code or instructions implementing the processes of the illustrative embodiments may be located. Data processing system 200 is described as a computer only as an example, without being limited thereto. Implementations in the form of focus tracking device 117 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
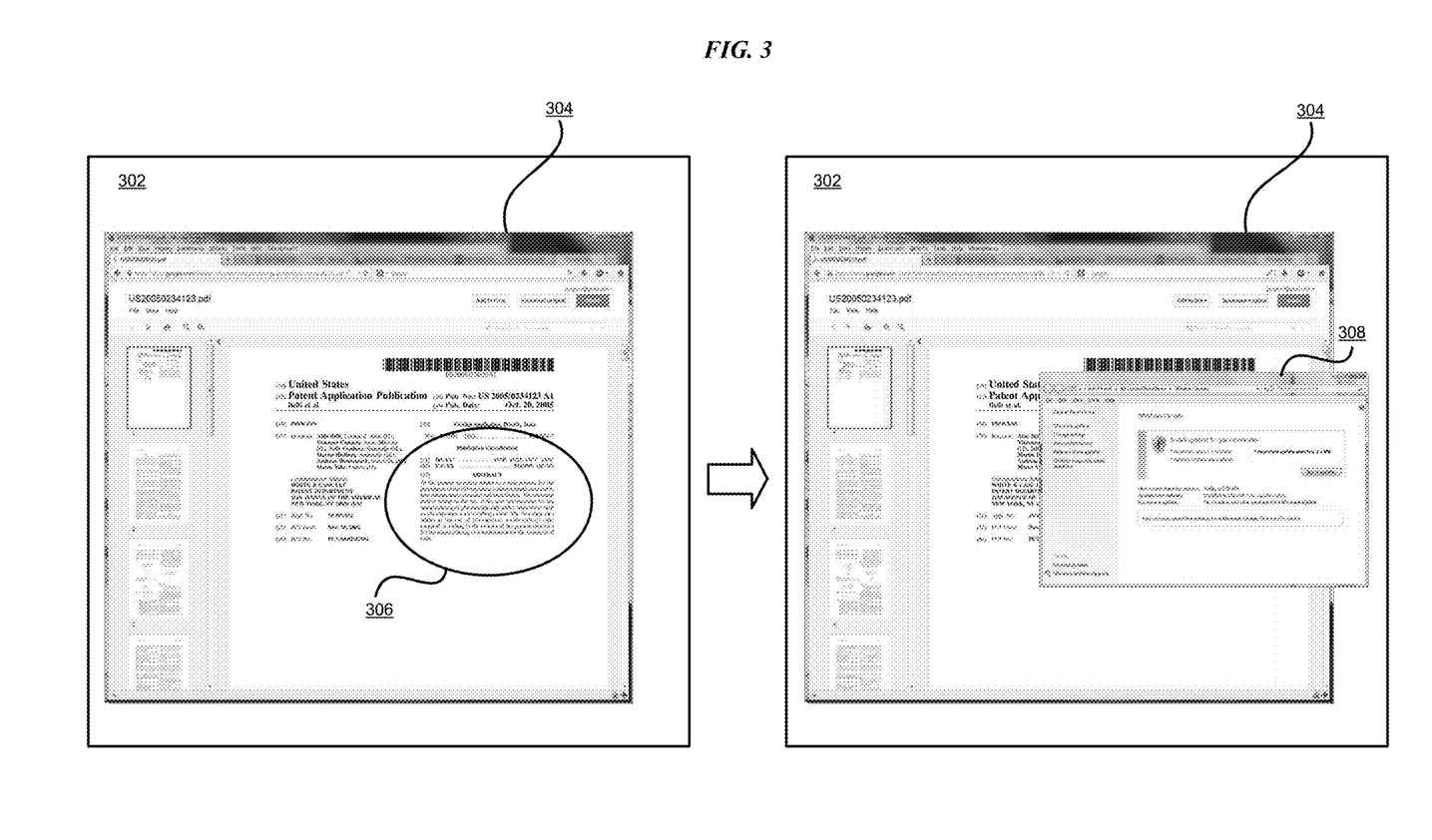
FIG. 3 depicts a screenshot view of intrusive pop-up placement that can be avoided or made less intrusive by using an illustrative embodiment.

With reference to FIG. 3, this figure depicts a screenshot view of intrusive pop-up placement that can be avoided or made less intrusive by using an illustrative embodiment.

On the left side of the depictions, area 302 of a display device is the area that is usable for presenting content and GUI artifacts such as windows and pop-ups. For example, window 304 is depicted to include the presentation of content 306. More particularly, in the depicted example, window 304 depicts a browser wherein the text of a patent application publication is displayed. Assume that a user is focused on reading content 306, which includes the abstract of the patent application in the right hand column of a page of the patent application publication.

The other half of the depiction of FIG. 3 shows the problem recognized by the illustrative embodiments in the present implementation of pop-ups. For example, with area 302, and window 304 and the content therein being the same as on the left side, pop-up 308 is displayed in area 302. Presently, pop-up 308 is presented in area 302 without regard to content 306 where the user's attention was focused in the depicted example. Consequently, pop-up 308 obscures content 306 (not visible on the right side of FIG. 3) from the user's view. This manner of presenting pop-ups, as is presently the case, is obtrusive for the reasons described earlier.

Figure 4:
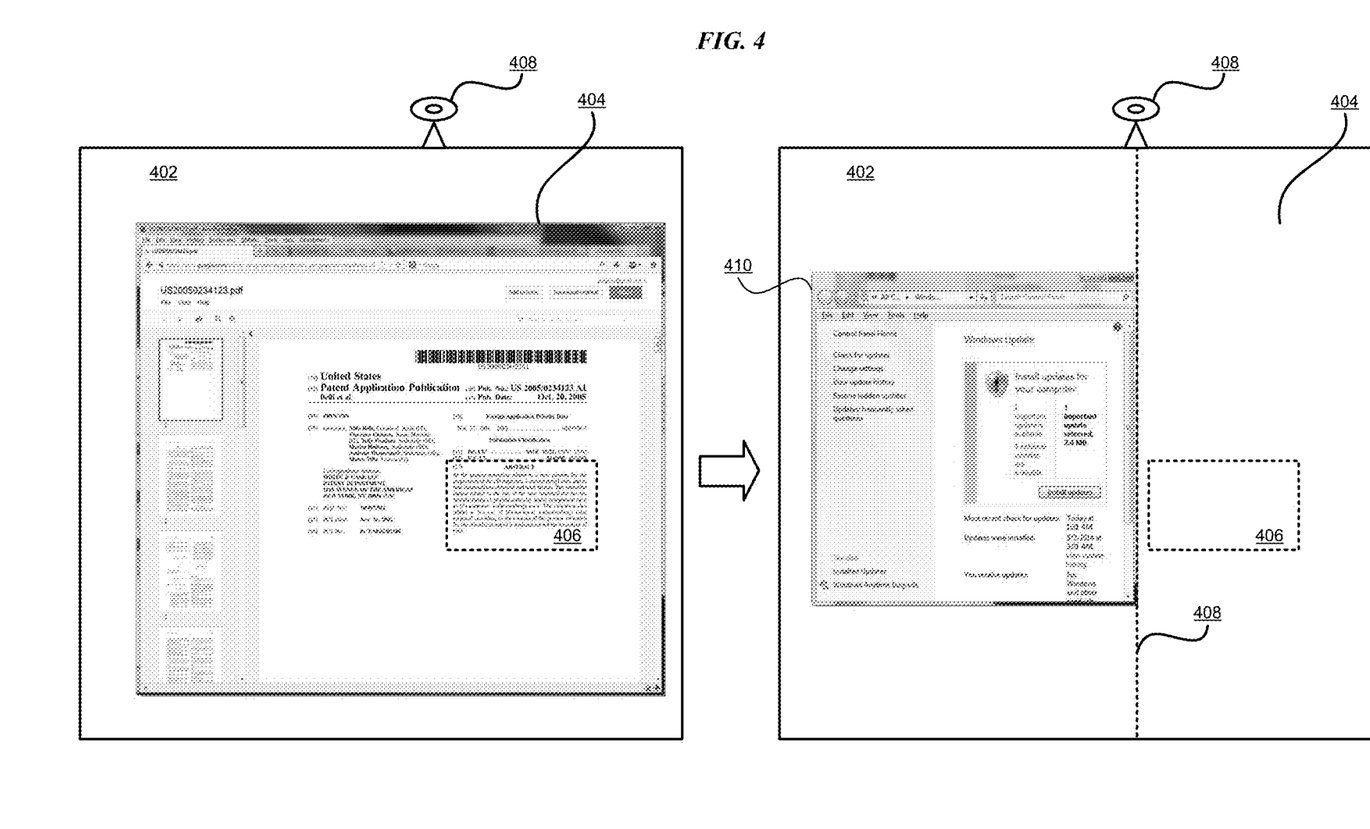
FIG. 4 depicts a block diagram of a result of unobtrusive sizing and placement of pop-ups in accordance with an illustrative embodiment.

With reference to FIG. 4, this figure depicts a block diagram of a result of unobtrusive sizing and placement of pop-ups in accordance with an illustrative embodiment. Area 402 is similar to area 302 in FIG. 3. Window 404 is similar to window 304 in FIG. 3.

Refer to the left side of FIG. 4. An embodiment, such as in an implementation of application 115 in FIG. 1, determines that a user is focused on area 406 and the content displayed therein. As an example, the application uses focus tracking device 408 to ascertain area 406 as the area of focus. Device 408 is similar to device 117 in FIG. 1 and may be any device or apparatus suited for the purpose of determining that the user is focused on the contents of area 406.

Now refer to the right side of FIG. 4. The application determines that a pop-up is about to be displayed in area 402. The application determines that the portion of area 402 that lies to the left of line 408 is not the subject of the user's present attention. The application further determines that such portion of area 402 is also unlikely to receive attention in a certain amount of time in the future. Note that such amounts of time can be pre-configured or pre-determined, or can be dynamically determined based on the geometry of area 406, density or type of content in area 406, and many other factors.

Based on the determination of the user's present focus and likely future focus, the application selects the portion to the left of line 408 as the portion of area 402 where the impending pop-up should be displayed. The application further determines how much area is available in that portion to the left of line 408 to display the pop-up.

The application adjusts or manipulates a size of the pop-up so that the pop-up will fit in available area in the portion to the left of line 408. The application presents pop-up 410 in the available area in the portion to the left of line 408.

Thus, the contents of pop-up 410 are similar to the contents of pop-up 308 in FIG. 3, but pop-up 410 has been advantageously resized and repositioned by the application. By presenting pop-up 410 in this resized and repositioned manner, note that area 406 remains unobscured by pop-up 410, and pop-up 410 does not become obtrusive to the user.

Figure 5:
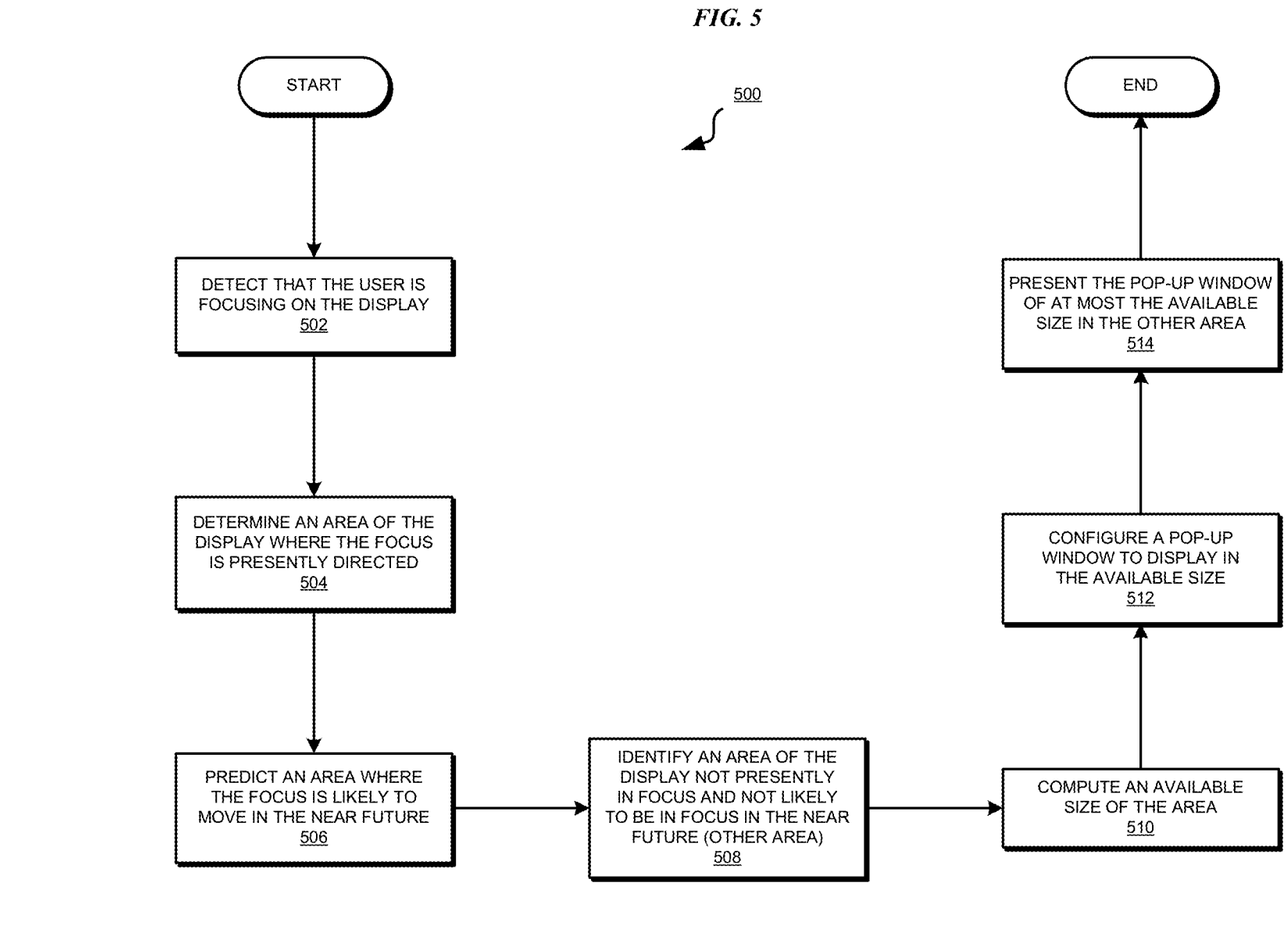
FIG. 5 depicts a flowchart of an example process of unobtrusive sizing and placement of pop-ups in accordance with an illustrative embodiment.

With reference to FIG. 5, this figure depicts a flowchart of an example process of unobtrusive sizing and placement of pop-ups in accordance with an illustrative embodiment. Process 500 can be implemented in application 115 in FIG. 1.

The application detects that the user is focusing on something on the display, e.g., some content displayed on the display device (block 502). The application determines an area of the display device where the user's focus is directed at the time (block 504). The application predicts an area where the focus is likely to move in the near future (block 506). The application identifies an area of the display device that is not subject to the user's focus at the time and also not likely to be in the user's focus in the near future (block 508). Such area identified in block 508 is referred to as the "other area".

The application computes an available size of the display space in the other area (block 510). The application configures a pop-up, e.g., a pop-up that has is ready for presentation on the display device but has not yet been presented on the display device, to be presentable in the available size of the display space in the other area (block 512).

The application presents the pop-up in the other area such that the GUI artifact of the pop-up, e.g., a pop-up window, is at most the size of the available size in the other area (block 514). The application ends process 500 thereafter.

Figure 6:
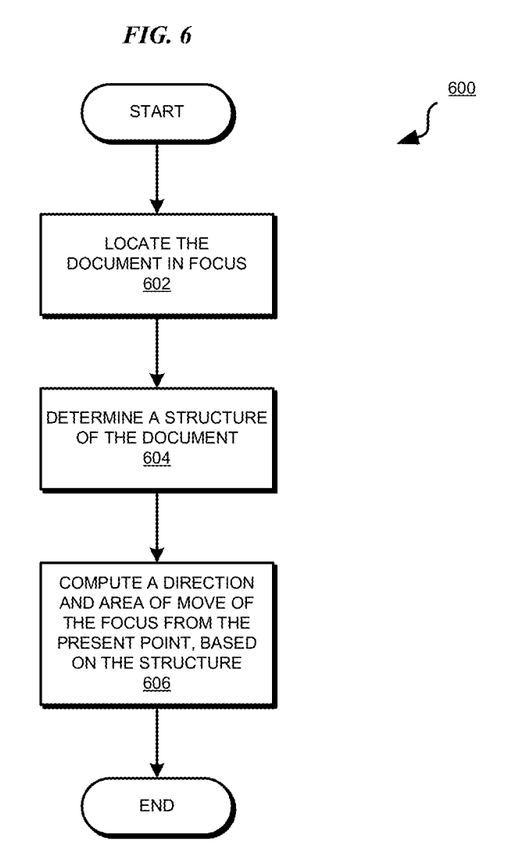
FIG. 6 depicts a flowchart of an example process for predicting an area where the focus is likely to shift in the near future in accordance with an illustrative embodiment.

With reference to FIG. 6, this figure depicts a flowchart of an example process for predicting an area where the focus is likely to shift in the near future in accordance with an illustrative embodiment. Process 600 can be implemented as block 506 in FIG. 5.

When the content that is receiving the user's focus is a structured document, the application can predict the location of future focus in the following example manner. The application locates the document that is currently receiving the user's focus or attention at the time (block 602). The application determines the structure of the portion of the document that is currently being displayed to the user (block 604). For example, as in FIGS. 3 and 4, the application can determine from the metadata of the PDF document that the user is focusing on the right column of the two columns on page 1 of the document.

Based on the determined structure, the application computes a direction and area where the focus is likely to move from the present area of focus, such as over the period between the present time and the estimated time when the pop-up will be displayed to the user (block 606). The application ends process 600 thereafter. Using the direction and are computed in block 606, the application can form the prediction of block 506 in FIG. 5.

Figure 7:
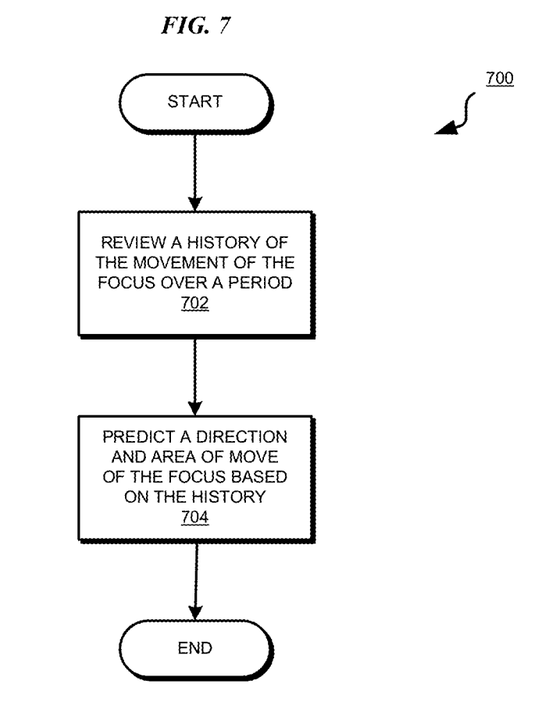
FIG. 7 depicts a flowchart of another example process for predicting an area where the focus is likely to shift in the near future in accordance with an illustrative embodiment.

With reference to FIG. 7, this figure depicts a flowchart of another example process for predicting an area where the focus is likely to shift in the near future in accordance with an illustrative embodiment. Process 700 can be implemented as block 506 in FIG. 5.

When the application has been tracking the user's focus for a period, the historical focus tracking information can be a reliable indicator of the direction, speed, and target of future focus changes. Using stored historical focus tracking information, such as in repository 119 in FIG. 1, the application can predict the location of future focus in the following example manner. The application reviews the history of the movement of the user's focus over a given period in the past (block 702). The application predicts a direction and area where the focus is likely to move from the present location based on the history of focus movements (block 704). The application ends process 700 thereafter. Using the direction and are computed in block 704, the application can form the prediction of block 506 in FIG. 5.

For example, as in FIGS. 3 and 4, the application can determine from the historical information of the focus movement that the user's focus moves left to right from one location to another in bounded area such as a column, down a certain distance, and then again left to right in the same bounded area. If the application determines that the area is displaying text, the application computes a logical conclusion that this determined trend of focus movement will continue for some period into the future, e.g., between the present time and the time when the pop-up is displayed. Based on such a conclusion, the application computes a direction and area where the focus is likely to move from the present area of focus.

Thus, a computer implemented method, system or apparatus, and computer program product are provided in the illustrative embodiments for unobtrusive sizing and placement of pop-ups.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for displaying a pop-up graphical user interface (GUI), the method comprising:
   detecting, using a device to detect eye movements, a first area of a display device where a content is being displayed, the first area being where an attention of a user is focused;
   determining a specific future display time when the pop-up GUI is to be displayed;
   predicting a change in the attention of the user from the first area to a second area over a period of time in the future between a present time and the future display time based on a trend of focus movement, wherein the second area is reached from the first area when the eye movements of the user continue in the direction over the time in the future between a present time and the specific future display time;
   identifying a third area on the display device, wherein the third area excludes the first and the second areas;
   determining a size of an available space in the third area, wherein the available space in the third area is usable for displaying the pop-up GUI;
   resizing the pop-up GUI to form a resized pop-up GUI such that the resized pop-up GUI does not exceed the size of the available space when displayed on the display device, wherein the displaying the pop-up is displaying the resized pop-up; and
   displaying the pop-up GUI in the third area at the future display time.

2. The method of claim 1, further comprising:
   reviewing a historical data, the historical data comprising data of eye movements of the user over a past period;
   determining from the reviewing a direction of the change in the attention of the user; and
   using the direction in the predicting.

3. The method of claim 2, further comprising:
determining from the reviewing a speed of the change in the attention of the user; and
using the speed in the predicting.

4. The method of claim 1, further comprising:
identifying a document, wherein the document includes the content being displayed;
determining from a metadata of the document, a structure of the content in the first area; and
using the structure in the predicting.

5. The method of claim 4, further comprising:
determining a direction and a distance of eye movement within the first area; and determining, using the direction, the distance, and the structure of the content in the first area, the second area.

6. The method of claim 1, wherein the third area further excludes a fourth area that lies between the first area and the second area, wherein the eye movement of the user is expected to cross the fourth area during an interval between a current time and the specific future display time.

7. A computer usable program product comprising a computer readable storage medium including computer usable code for displaying a pop-up graphical user interface (GUI), the computer usable code comprising:
computer usable code for detecting, using a device to detect eye movements, a first area of a display device where a content is being displayed, the first area being where an attention of a user is focused;
computer usable code for determining a specific future display time when the pop-up GUI is to be displayed;
computer usable code for predicting a change in the attention of the user from the first area to a second area over a period of time in the future between a present time and the future display time based on a trend of focus movement, wherein the second area is reached from the first area when the eye movements of the user continue in the direction over the time in the future between a present time and the specific future display time;
computer usable code for identifying a third area on the display device, wherein the third area excludes the first and the second areas;
computer usable code for determining a size of an available space in the third area, wherein the available space in the third area is usable for displaying the pop-up GUI;
computer usable code for resizing the pop-up GUI to form a resized pop-up GUI such that the resized pop-up GUI does not exceed the size of the available space when displayed on the display device, wherein the displaying the pop-up is displaying the resized pop-up; and
computer usable code for displaying the pop-up GUI in the third area at the future display time.

8. The computer usable program product of claim 7, further comprising:
computer usable code for reviewing a historical data, the historical data comprising data of eye movements of the user over a past period;
computer usable code for determining from the reviewing a direction of the change in the attention of the user; and
computer usable code for using the direction in the predicting.

9. The computer usable program product of claim 8, further comprising:
computer usable code for determining from the reviewing a speed of the change in the attention of the user; and
computer usable code for using the speed in the predicting.

10. The computer usable program product of claim 7, further comprising:
computer usable code for identifying a document, wherein the document includes the content being displayed;
computer usable code for determining from a metadata of the document, a structure of the content in the first area; and
computer usable code for using the structure in the predicting.

11. The computer usable program product of claim 10, further comprising:
computer usable code for determining a direction and a distance of eye movement within the first area; and
computer usable code for determining, using the direction, the distance, and the structure of the content in the first area, the second area.

12. The computer usable program product of claim 7, wherein the computer usable code is stored in a computer readable storage medium in a data processing system, and wherein the computer usable code is transferred over a network from a remote data processing system.

13. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

14. A data processing system for displaying a pop-up graphical user interface (GUI), the data processing system comprising:
a storage device including a storage medium, wherein the storage device stores computer usable program code; and
a processor, wherein the processor executes the computer usable program code, and wherein the computer usable program code comprises:
computer usable code for detecting, using a device to detect eye movements, a first area of a display device where a content is being displayed, the first area being where an attention of a user is focused;
computer usable code for determining a specific future display time when the pop-up GUI is to be displayed;
computer usable code for predicting a change in the attention of the user from the first area to a second area over a period of time in the future between a present time and the future display time based on a trend of focus movement, wherein the second area is reached from the first area when the eye movements of the user continue in the direction over the time in the future between a present time and the specific future display time;
computer usable code for identifying a third area on the display device, wherein the third area excludes the first and the second areas;
computer usable code for determining a size of an available space in the third area, wherein the available space in the third area is usable for displaying the pop-up GUI;
computer usable code for resizing the pop-up GUI to form a resized pop-up GUI such that the resized pop-up GUI does not exceed the size of the available space when displayed on the display device, wherein the displaying the pop-up is displaying the resized pop-up; and computer usable code for displaying the pop-up GUI in the third area at the future display time.

\* \* \* \* \*